May 22, 1923.
F. J. RAUH
MILK CAN
Filed June 9, 1921
1,456,404
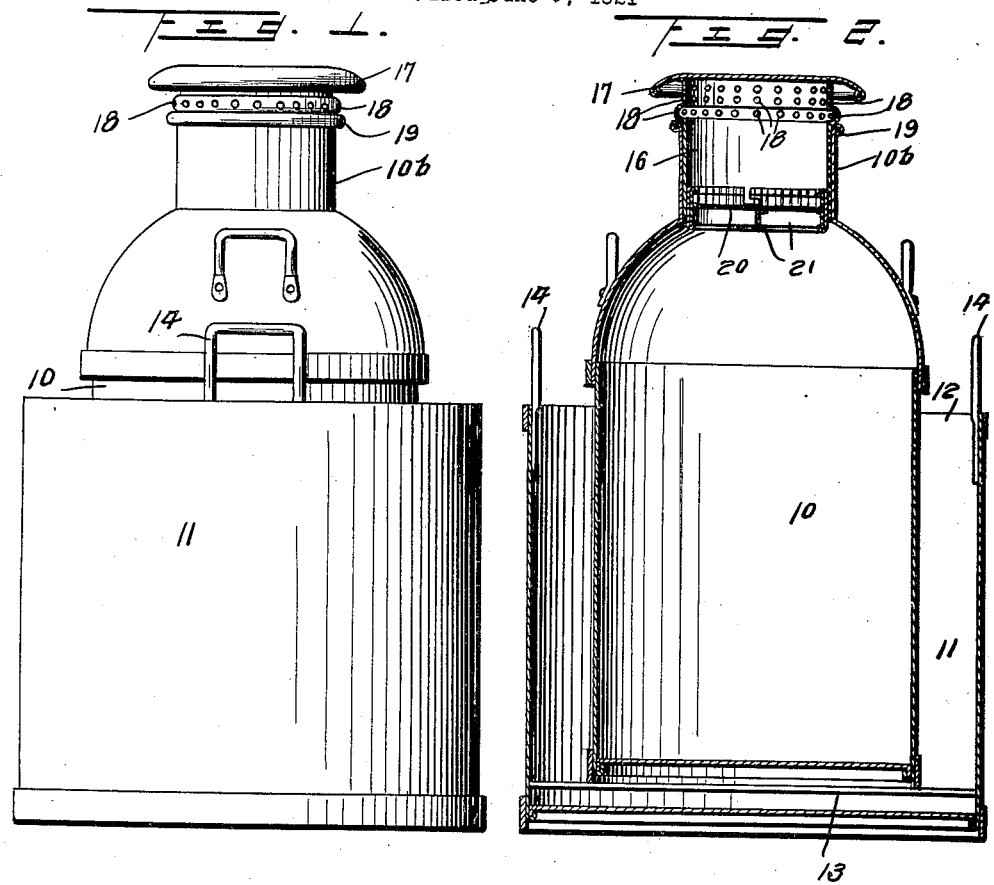
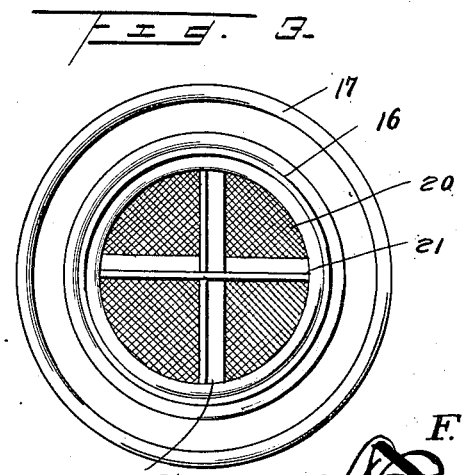
INVENTOR
F. J. Rauh
BY
ATTORNEY Patented May 22, 1923.

1,456,404

UNITED STATES PATENT OFFICE.

FRANK J. RAUH, OF BAKERSFIELD, CALIFORNIA.

MILK CAN.

Application filed June 9, 1921. Serial No. 476,260.

*To all whom it may concern:*

Be it known that I, FRANK J. RAUH, a citizen of the United States, residing at Bakersfield, in the county of Kern and State of California, have invented certain new and useful Improvements in Milk Cans; and I do hereby declare the following to be a full, clear, and exact description of the invention, such as will enable others skilled in the art to which it appertains to make and use the same.

The object of the invention is to provide a simple and efficient can for use in shipping milk, cream and similar dairy products under conditions affording the proper ventilation and release of the animal heat or vapors while minimizing the tendency to agitation in transit and at the same time adapted for maintaining a proper temperature to prevent the development of acid and hence the tendency of the milk to become soured, even though a considerable time may elapse between the milking operation and the receipt of the product by the consumer; and with these objects in view the invention consists in a construction combination and relation of parts of which a preferred embodiment is shown in the accompanying drawing:—

Figure 1 is a side view of the milk can embodying the invention.

Figure 2 is a sectional view taken vertically and centrally of the same.

Figure 3 is an inverted plan view of the cover.

The milk can proper as shown at 10 may be of the ordinary commercial form and type fitted in a jacket or carrier 11 of sufficiently larger diameter than the body of the can to form a space 12 adapted to contain chilled water or ice and water, the bottom of the can resting on crossed supporting rods 13 to hold the same out of contact with the bottom of the jacket so that the entire can throughout the portion occupied by the milk or cream is subjected to the influence of the tempering liquid. The jacket is provided at its upper edge at diametrically opposite points with upstanding looped handles 14 by which the receptacle may readily be carried in transportation to and from the vehicles, cars or other means of transportation.

Fitted in the neck $10^b$ of the can is a hollow cylindrical cover 16 having an overhanging cap 17 beneath which the walls of the cover are perforated as indicated at 18 to provide for ventilation, the perforated portion of the cover being above the plane of the lip 19 and the lower end of the cylindrical portion being open to facilitate cleansing of the same and fitted with a removable screen 20 of fine wire gauze supported by bars 21 which constitute breakers which minimize the splashing back and forth of the milk on the surface due to the jarring or rocking of the vehicle by which the receptacles are carried and thus minimize the tendency to the breaking up of the milk or the churning thereof and hence the separation which is objectionable when the milk is intended for use in its original form. To increase the efficiency of the breaker bars for the purpose indicated they are preferably made of cross sectionally flat and form in vertical planes as indicated and are of considerable width vertically to act as baffles to check the movement of the milk.

What is claimed is:—

A milk can having a cover consisting of a relatively long cylindrical wall open at its lower end and provided with an overhanging cap, the upper portion of the wall being perforated for ventilation, a pair of studs carried by said wall adjacent its lower end, a ring formed with slots to receive the studs and thereby secure the ring to the cylinder, a screen carried by said ring, and flat vertically disposed breaker bars carried by said ring below said screen and in supporting relation therewith, said bars being adapted to be gripped to rotate said ring to secure it in place or release it from the studs to permit its withdrawal from the cylinder.

In testimony whereof I affix my signature in presence of two witnesses.

FRANK J. RAUH.

Witnesses:
E. J. EMMONS,
A. FERGUSON.